(12) United States Patent
Erimli et al.

(10) Patent No.: US 6,904,545 B1
(45) Date of Patent: Jun. 7, 2005

(54) FAULT TOLERANT COMPUTING NODE HAVING MULTIPLE HOST CHANNEL ADAPTERS

(75) Inventors: Bahadir Erimli, Campbell, CA (US); Joseph A. Bailey, Austin, TX (US); Norman M. Hack, Plugerville, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 561 days.

(21) Appl. No.: 09/901,683

(22) Filed: Jul. 11, 2001

(51) Int. Cl.[7] .............................................. G06F 11/00
(52) U.S. Cl. ............................................ 714/43; 714/4
(58) Field of Search ................................. 714/4, 43, 10

(56) References Cited

U.S. PATENT DOCUMENTS

| | | | |
|---|---|---|---|
| 6,314,525 B1 * | 11/2001 | Mahalingham et al. | 714/4 |
| 6,661,773 B1 * | 12/2003 | Pelissier et al. | 370/228 |
| 6,694,361 B1 * | 2/2004 | Shah et al. | 709/222 |
| 2002/0087720 A1 * | 7/2002 | Davis et al. | 709/238 |
| 2003/0005039 A1 * | 1/2003 | Craddock et al. | 709/203 |
| 2003/0023896 A1 * | 1/2003 | Kashyap | 714/5 |

OTHER PUBLICATIONS

Krause, Eric. HyperTransportTM Tecfhnology and Infini-Band Architecture: The Complete High Bandwidth I/O Solution. Jan. 10, 2002.*

Cravotta, Nicholas. InfiniBand unleased. May 3, 2001. www.ednmag.com.*

Hall, Mark InfiniBand. www.computerworld.com.*

Pargal, Shravan. InfiniBand SubnetManagement. Apr. 30, 2001.*

Buonadonna, Philip. Analysis of an Infiniband Channel Adapter.gec.di.uminho.pt/Discip/Mlnf/ac0203/ICCA03/Infiniband_Proto.pdf.*

Daniel Cassiday, InfiniBand™ Architecture Tutorial, Hot Chips, Aug. 2000, Sun Microsystems, 79 pages.

* cited by examiner

*Primary Examiner*—Robert Beausoliel
*Assistant Examiner*—Yolanda Wilson
(74) *Attorney, Agent, or Firm*—Manelli Denison & Selter PLLC; Leon R. Turkevich

(57) ABSTRACT

A computing node configured for communications on an InfiniBand™ network includes at least two host channel adapters configured for communications on the InfiniBand™ network, and at least one processor configured for controlling the communications of the two host channel adapters on the InfiniBand™ network. The host channel adapters communicate with the processor via an internal bus. The processor monitors communication operations by the host channel adapters on the InfiniBand™ network. If the processor detects that one of the host channel adapters is unable to complete the corresponding communication operations, the processor outputs a message requesting traffic destined to the one host channel adapter to be redirected to the remaining host channel adapter.

11 Claims, 4 Drawing Sheets

FAULT TOLERANT COMPUTING NODE HAVING MULTIPLE HOST CHANNEL ADAPTERS

BACKGROUND OF THE INVENTION

1. Field of the Invention

The present invention relates to an InfiniBand™ computing node configured for communication with remote computing nodes in an InfiniBand™ server system.

2. Background Art

Networking technology has encountered improvements in server architectures and design with a goal toward providing servers that are more robust and reliable in mission critical networking applications. In particular, the use of servers for responding to client requests has resulted in a necessity that servers have an extremely high reliability to ensure that the network remains operable. Hence, there has been a substantial concern about server reliability, accessibility, and serviceability.

In addition, processors used in servers have encountered substantial improvements, where the w microprocessor speed and bandwidth have exceeded the capacity of the connected input/out (I/O) buses, limiting the server throughput to the bus capacity. Accordingly, different server standards have been proposed in an attempt to improve server performance in terms of addressing, processor clustering, and high-speed I/O.

These different proposed server standards led to the development of the InfiniBand™ Architecture Specification, (Release 1.0), adopted by the InfiniBand™ Trade Association. The InfiniBand™ Architecture Specification specifies a high-speed networking connection between central processing units, peripherals, and switches inside a server system. Hence, the term "InfiniBand™ network" refers to a network within a server system. The InfiniBand™ Architecture Specification specifies both I/O operations and interprocessor communications (IPC).

A particular feature of InfiniBand™ Architecture Specification is the proposed implementation in hardware of the transport layer services present in existing networking protocols, such as TCP/IP based protocols. The hardware-based implementation of transport layer services provides the advantage of reducing processing requirements of the central processing unit (i.e., "offloading"), hence offloading the operating system of the server system.

The InfiniBand™ Architecture Specification describes a network architecture, illustrated in FIG. 1 The network 10 includes nodes 11, each having an associated channel adapter 12 or 14. For example, the computing node 11a includes processors 16 and a host channel adapter (HCA) 12; the destination target nodes 11b and 11c include target channel adapters 14a and 14b, and target devices (e.g., peripherals such as Ethernet bridges or storage devices) 18a and 18b, respectively. The network 10 also includes routers 20, and InfiniBand™ switches 22.

Channel adapters operate as interface devices for respective server subsystems (i.e., nodes). For example, host channel adapters (HCAS) 12 are used to provide the computing node 11a with an interface connection to the InfiniBand™ network 10, and target channel adapters (TCAs) 14 are used to provide the destination target nodes 11b and 11c with an interface connection to the InfiniBand™ network. Host channel adapters 12 may be connected to a memory controller 24 as illustrated in FIG. 1. Host channel adapters 12 implement the transport layer using a virtual interface referred to as the "verbs" layer that defines the manner in which the processor 16 and the operating system communicate with the associated HCA 12: verbs are data structures (e.g., commands) used by application software to communicate with the HCA. Target channel adapters 14, however, lack the verbs layer, and hence communicate with their respective devices 18 according to the respective device protocol (e.g., PCI, SCSI, etc.).

However, arbitrary hardware implementations may result in computing nodes that still are susceptible to failure. For example, the computing node 11a may encounter a link failure due to a failure in the link coupled to the HCA 12, or a failure in the HCA 12 itself. Hence, the computing node 11a suffers a loss of communications that may cause a server failure.

SUMMARY OF THE INVENTION

There is a need for an arrangement that provides fault-tolerant communications of a computing node in an InfiniBand™ network.

These and other needs are attained by the present invention, where a computing node configured for communications on an InfiniBand™ network includes at least two host channel adapters configured for communications on the InfiniBand™ network, and at least one processor configured for controlling the communications of the two host channel adapters on the InfiniBand™ network. The host channel adapters communicate with the processor via an internal bus. The processor monitors communication operations by the host channel adapters on the InfiniBand™ network. If the processor detects that one of the host channel adapters is unable to complete the corresponding communication operations, for example due to a link failure detected by the one host channel adapter, a failure in the internal bus coupling the one host channel adapter to the processor, or a failure in the one host processor itself, the processor outputs a message requesting traffic destined to the one host channel adapter to be redirected to the remaining host channel adapter. Hence, communication operations can continue despite a failure of communication operations associated with the one host channel adapter.

One aspect of the present invention provides a computing node configured for communications on an InfiniBand™ network. The computing node includes first and second host channel adapters configured for respective first and second communication operations with the InfiniBand™ network, and a processor. The processor is configured for monitoring the first and second communication operations and detecting a failure in any one of the first and second communication operations. The processor, in response to detecting the failure as affecting the first communication operations by the first host channel adapter, is configured for causing the first communication operations to be transferred to the second host channel adapter.

Another aspect of the present invention provides a method in a computing node configured for communications on an InfiniBand™ network. The method includes the steps of configuring first and second host channel adapters within the computing node for respective first and second communication operations with the InfiniBand™ network. The method also includes detecting a failure in the first communication operations by the processor within the computing node, and transferring the first communication operations to the second host channel adapter by the processor, based on the detected failure.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
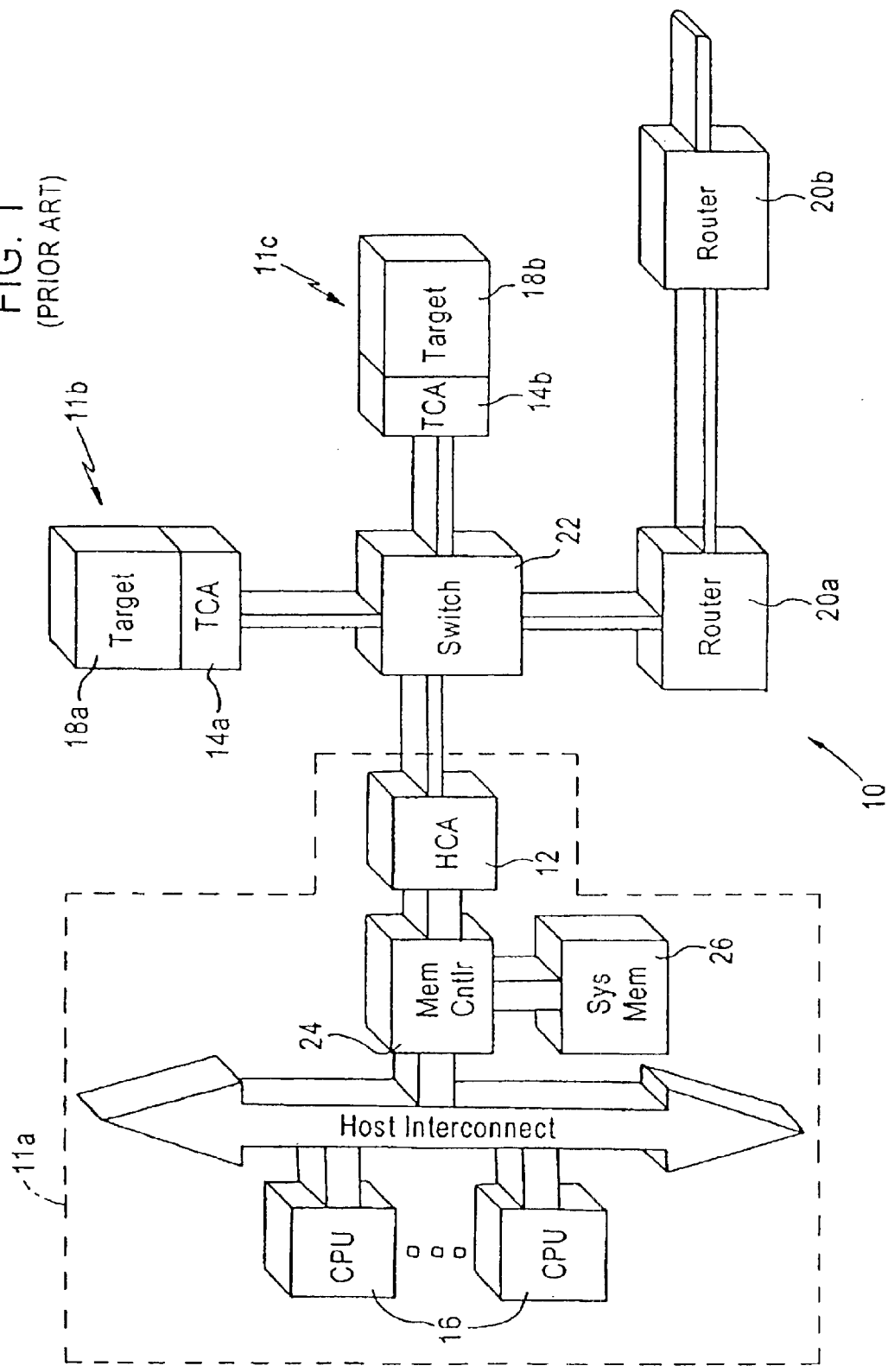
FIG. 1 is a diagram illustrating a conventional network according to the InfiniBand™ Architecture Specification.
Figure 2:
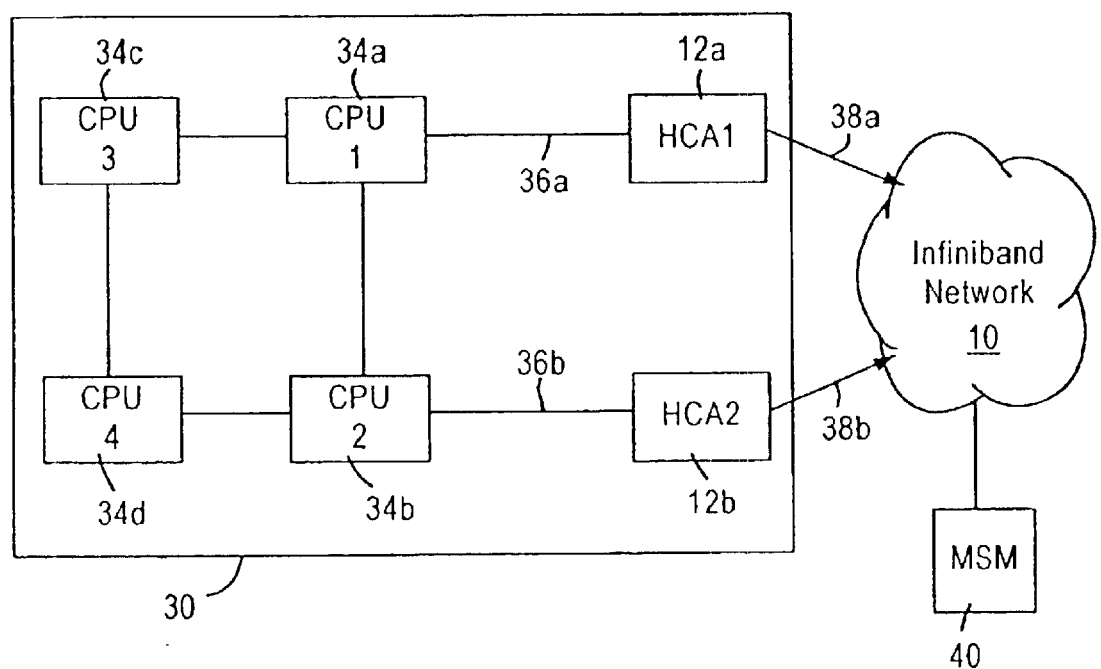
FIG. 2 is a diagram illustrating a computing node configured for providing fault tolerant InfiniBand™ communications for an InfiniBand™ network, according to an embodiment of the present invention.

FIG. 2 is a block diagram illustrating in detail a computing node 30 configured for sending and receiving data packets on an InfiniBand™ network according to an embodiment of the present invention. The computing node 30 includes first and second host channel adapters (HCA) 12a and 12b, described in detail below with reference to FIG. 4, each configured for providing independent communication operations for respective network traffic flows with the InfiniBand™ network 10. The computing node 30 also includes at least one central processing unit (CPU) 34 configured for generating commands for the HCAs 12 using a verbs layer, described below, causing the HCAs 12 to output packets according to InfiniBand™ protocol. As illustrated in FIG. 2, the computing node 30 includes multiple processors 34 for additional fault-tolerant redundancy.

Each HCA 12 serves as a separate and independent interface for the CPU 34 to the InfiniBand™ network 10 based on communication with a processor 34 via a corresponding internal bus 36. The CPU 34 communicates with the HCA 12 via the corresponding internal bus 36 using, for example, the HyperTransport™ technology commercially available from Advanced Micro Devices, Inc., Sunnyvale, Calif.

For example, the first HCA 12a is configured for communication with any one of the processors 34 via a corresponding internal bus 36a, and the second HCA 12b, is configured for communication with any one of the processors 34 via a corresponding internal bus 36b. Hence, the processors 34 can redirect communication operations from one HCA (e.g., "HCA1" 12a) to another operative HCA (e.g., "HCA2" 12b,) based on a failure in an InfiniBand™ link 38, a corresponding internal bus 36, or a hardware failure within the HCA 12. As described below, the processor transferring the communication operations to the operative HCA 12 sends a request to a master subnet manager 40 (MSM), having a prescribed presence on the InfiniBand™ network, to redirect the network traffic originally assigned to the failing HCA (e.g., 12a) to the operable HCA (e.g., 12b,); upon receiving an acknowledgment from the master subnet manager 40, the processors 34 can begin sending and receiving network traffic, originally assigned to the failing HCA (e.g., 12a), via the newly assigned HCA (e.g., 12b,).

Figure 3:
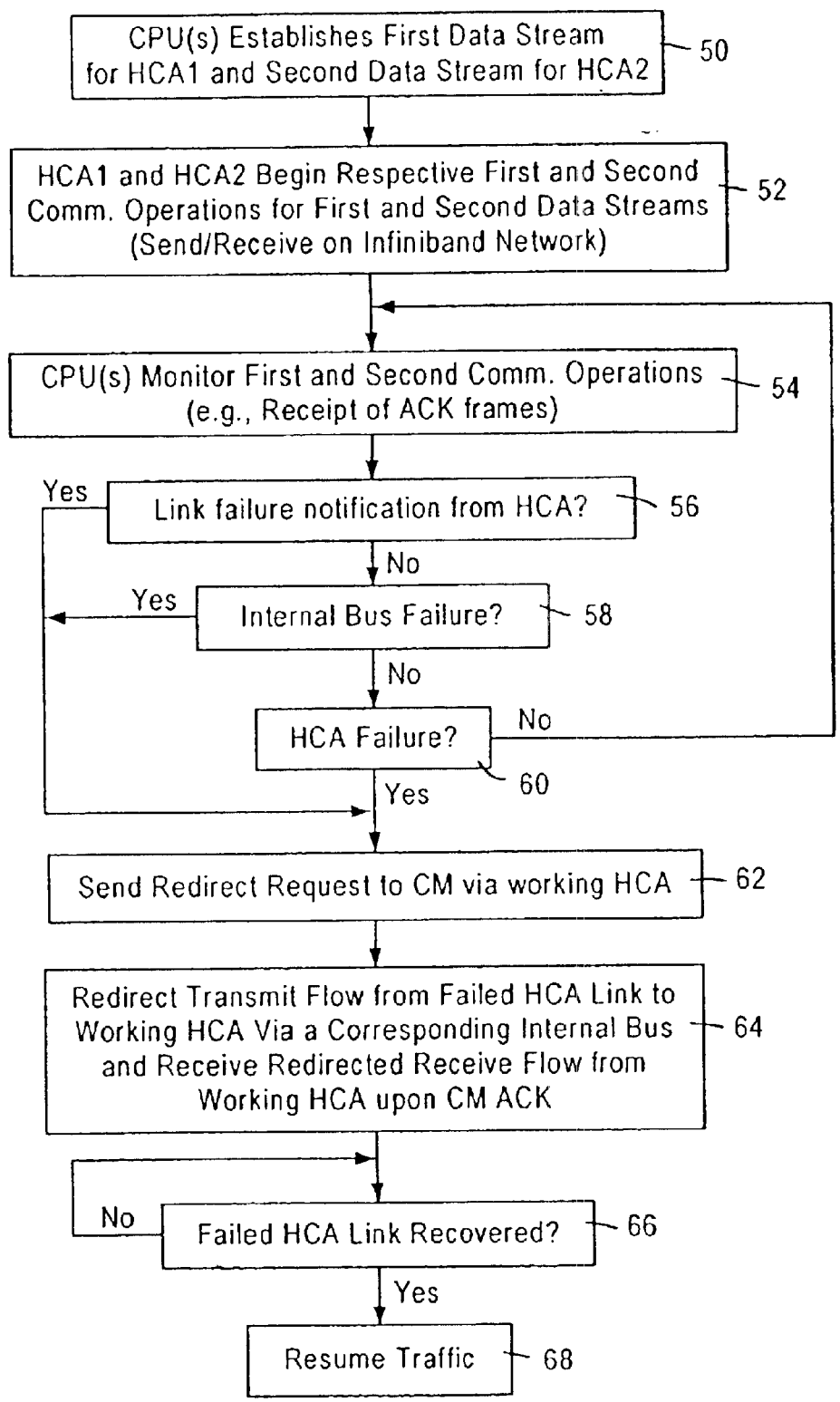
FIG. 3 is a diagram illustrating the method of providing fault tolerant communications by the computing node of FIG. 2, according to an embodiment of the present invention.

FIG. 3 is a diagram illustrating the method of providing fault-tolerant communications in the computing node 30 according to an embodiment of the present invention. The method begins in step 50, where the processors 34 establish respective data streams for the HCAs 12a and 12b,; as described below with respect to FIG. 4, data streams are established by the establishment of queue pairs and WQEs for each HCA 12. The HCAs 12a and 12b, begin the respective communication operations in step 52 for first and second data streams, for example sending and receiving data packets according to InfiniBand™ protocol: based on the received WQEs. The processors 34 monitor in step 54 the communication operations by the HCAs 12, for example by monitoring the receive queue of the WQEs assigned to the respective HCAs, or by monitoring the receive of acknowledgment frames by the HCAs 12.

The processors 34 monitor for any type of failure that may prevent an HCA 12 for performing its assigned communication operations. For example, the processors 34 determine whether a link failure notification is received from the HCA 12 in step 56, indicating a failure of the corresponding link 38 to the InfiniBand™ network 10. The processors 34 also monitor in step 58 whether an internal bus failure is encountered with the corresponding internal bus 36, for example due to a protocol violation or a checksum failure. The processors 34 also monitor in step 60 for a hardware failure in each of the HCAs 12.

If in steps 56, 58, or 60 a failure is detected (e.g., the HCA 12 is unable to send or receive data), one of the processors 34 sends a redirect request to the MSM 40 in step 62 via the internal bus (e.g., 36b) serving the operable HCA link (e.g., 38b) to redirect traffic flow from the failed HCA link (e.g., 38a). Upon receiving an acknowledgment from the MSM 40, the processors 34 redirect in step 64 the InfiniBand™ network traffic from the failed HCA (e.g., 12a) to the operable HCA (e.g., 12b,). Hence, the operable HCA handles all traffic flows for the computing node 30 until the processors 34 detect in step 66 that the failed HCA link (e.g. 38a) has recovered, at which point the processors send another redirect request to the MSM 40 to enable the recovered HCA (e.g., 12a) to resume traffic flow in step 68.

Figure 4:
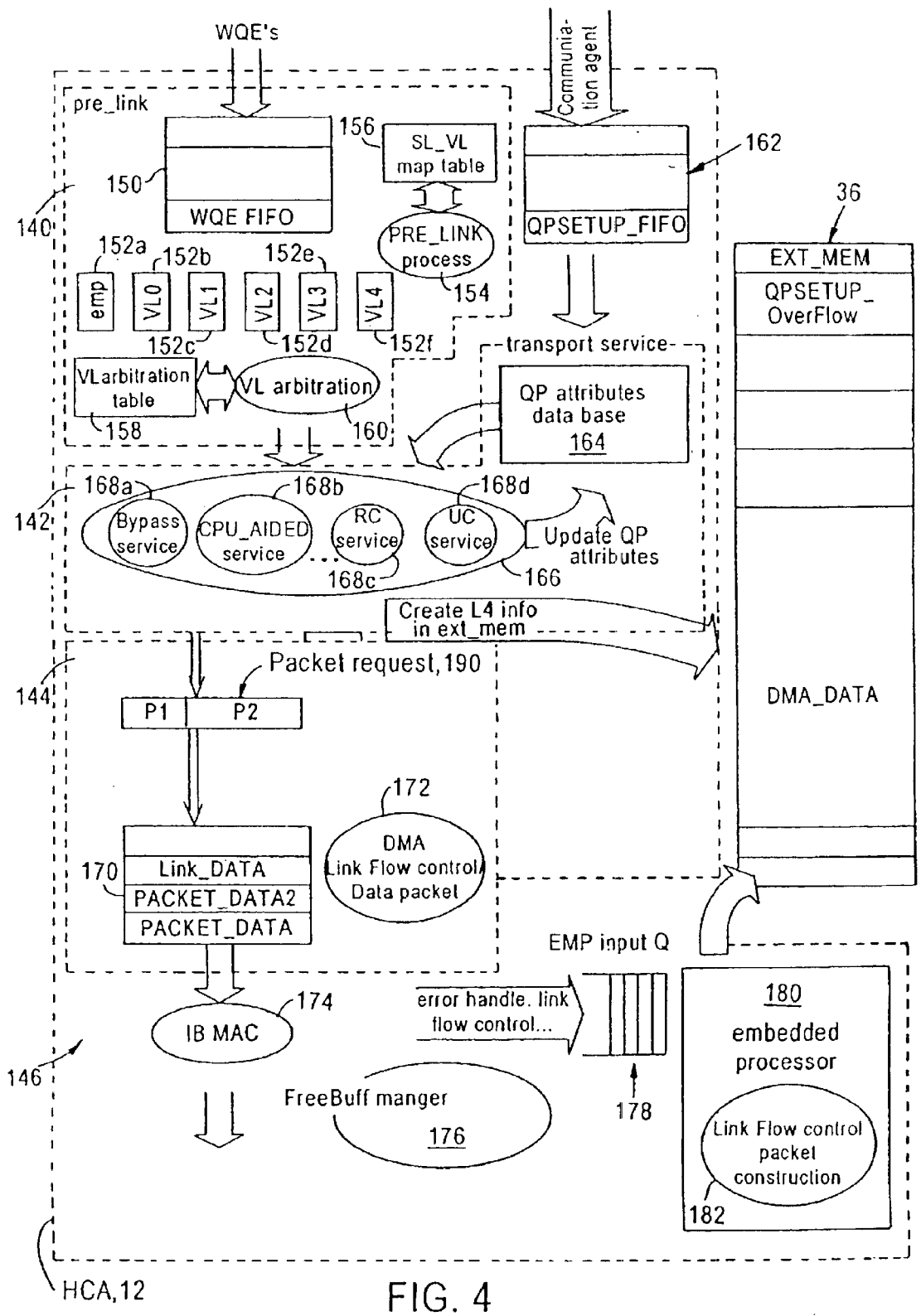
FIG. 4 is a diagram illustrating in detail one of the host channel adapters of FIG. 2 according to an embodiment of the present invention.

FIG. 4 is a block diagram illustrating a host channel adapter (HCA) 12 configured for generating and transmitting packets according to an embodiment of the present invention. The HCA 12, compliant with the InfiniBand™ Architecture Specification, is implemented in a manner that ensures that hardware resources are efficiently utilized by generating transmit packets according to a priority-based ordering. In addition, the disclosed HCA 12 provides flexibility by enabling embedded processes to be added without disruption of traffic flow. Hence, the HCA 12 can be implemented in an economical manner with minimal complexity relative to conventional implementation techniques.

One problem with conventional arrangements for implementing the HCA 12 according to the InfiniBand™ Architecture Specification is that transport layer service would be performed first, for example by constructing a transport layer header, generating a packet sequence number, validating the service type (e.g., reliable connection, reliable datagram, unreliable connection, unreliable datagram, etc.), and other transport layer operations. Once the transport layer operations have been completed, the packet would be sent to the link layer service for link layer operations, including service layer and virtual lane mapping, link layer flow control packet generation, link layer transmission credit checking, and other operations. Although this conventional type of implementation has the advantage of precisely following the network layers specified in the InfiniBand™ Architecture Specification, such an arrangement requires a substantially large amount of hardware. In particular, the transport layer generally requires more processing power than the link layer because the transport layer involves more complex operations. Hence, there is a need that the implementation of the transport layer in hardware does not result in a substantially complex hardware system. In addition, there is a concern with unnecessarily wasting transport layer resources on low priority operations.

According to the disclosed embodiment, link layer operations are partitioned based on the desirability to determine priorities of data packets to be transmitted. In particular, the HCA 12 includes a pre-link. module configured for determining a priority of received WQEs, and a post-link module configured for preparing a data packet for transmission on the network. The pre-link module 140 orders the WQEs according to priorities determined by the pre-link module, and outputs the WQEs in the determined order to a transport service module 142 configured for generating the appropriate transport layer headers for the WQEs based on the associated queue pair attributes. In other words, the pre-link module 140 prevents the transport service module 142 from wasting resources on low priority WQEs or blocking high priority WQE's within the transport layer process. Hence, higher priority connections obtain improved service at the transport layer through the HCA.

The HCA 12, implemented for example as an application-specific integrated circuit, includes a pre-link module 140, a transport service module 142, a post-link module 144, and a media access control (MAC) module 146. The HCA 12 also has local access to the memory 36 configured for storing transport data and overflow buffers.

The pre-link module 140 includes a work queue element FIFO 150, virtual lane FIFOs 152, a pre-link process module 154, a service layer to virtual lane (SL-VL) mapping table 156, a virtual lane (VL) arbitration table 158, and a virtual lane (VL) arbitration module 160.

The HCA 12 is configured for receiving data from a central processing unit (CPU) in the form of work queue elements (WQEs), stored in the WQE FIFO 150. Each WQE specifies a corresponding request, from a consumer application executed by the CPU (i.e., "requester"), for a corresponding prescribed operation to be performed by a destination InfiniBand™ network node (i.e., "responder"), for example a target The interaction between requester and responder is specified via a queue pair (QP), where a queue pair includes a send work queue and a receive work queue.

The WQE includes service level (SL) information, and a pointer to the location of the actual message in the system memory 36. The InfiniBand™ Architecture Specification defines a service level (SL) attribute that permits a packet traversing the InfiniBand™ network 10 to operate at one of sixteen available service levels. Hence, the requester can select an available service level (e.g., quality of service, priority; etc.) based on a selected priority of the WQE.

The pre-link module 140 provides both service level to virtual lane mapping (SL-VL mapping), and virtual lane arbitration. In particular, virtual lanes, defined in the Infini-Band™ Architecture Specification, enable multiple logical flows to be implemented over a single physical link, where link level flow control can be applied to one virtual lane without affecting other virtual lanes. The pre-link process module 154 is configured for managing and maintaining the service layer-virtual layer mapping table 156 In particular, the pre-link process module 154 retrieves a WQE from the WQE FIFO 150, and determines the corresponding virtual lane based on the service layer specified within the WQE. Upon identifying the appropriate virtual lane for the retrieved WQE, the pre-link process module 154 forwards the WQE to the corresponding virtual lane FIFO 152.

The pre-link module 140 includes virtual lane FIFOs 152*a*, 152*b*, 152*c*, 152*d*, 152*e*, and 152*f* for storage of WQEs based on the assignment by the pre-link process module 154. For example, the virtual lane FIFO 152*a* is used for storing WQEs associated with embedded processor operations, for example link layer control packets and handling of error conditions. In other words, when a prescribed operation is not implemented in hardware, the request is sent to an embedded processor queue 178 for further processing by an embedded processor 180, described below; hence the embedded processor 180 has its own assigned queue 152*a* for outputting packets into the flow of output data traffic. The virtual lane FIFO 152*b,* is used for storing WQEs associated with management traffic. The virtual lane FIFOs 152*c*, 152*d*, 152*e*, and 152*f* are used for storing WQEs associated with respective assigned virtual lanes. Although the disclosed embodiment discloses the use of four assigned virtual lanes, additional virtual lane FIFOs may be added for additional assigned virtual lanes.

The VL arbitration module 160 is implemented as a state machine with registers, and is configured for managing the VL arbitration table 158 for servicing of the virtual lanes, including setup, management, and teardown of the virtual lanes. The VL arbitration module 160 also determines which virtual lane to service, and outputs the WQEs from the virtual lane FIFOs 152 based on the determined priority of the virtual lanes. For example, the virtual lane FIFO 152*b,* typically stores management (high-priority) traffic, hence the VL arbitration module 160 typically would empty the virtual lane FIFO 152*b,* before servicing the other virtual lane FIFOs 152*c*, 152*d*, 152*e*, or 152*f.* The VL arbitration module 160 would then selectively output the WQEs from the virtual lane FIFOs 152*c*, 152*d*, 152*e*, or 152*f* based on weighted priorities stored in respective weight tables within the VL arbitration table 158.

Hence, the pre-link module 140 outputs the WQEs in a prescribed order based on a determined priority of the WQEs, for example based on assigned virtual lanes, or whether the WQE is for an embedded process, management traffic, or flow control traffic.

The transport service module 142 is configured for managing transport services, including setup, management, and teardown of queue pairs. In particular, the HCA 12 includes a queue pair setup FIFO 162 configured for storing queue pair commands received from a communication management agent. The communication management agent is responsible for setup and teardown of transport connections: the communication management agent communicates with a subnet manager to establish the transport connections (i.e., queue pairs) for the HCA 12. In addition, the communication management agents at each end during connection establishment use a bypass service (described below with respect to bypass service submodule 168*a*), as opposed to a conventional transport layer service, to establish the transport connections.

The transport service module 142 includes a queue pair attributes database 164 and a queue pair attributes management module 166. The queue pair attributes management module 166 is configured for processing the queue pair commands in the queue pair setup FIFO 162, and updating the queue pair attributes database 164 based on the received queue pair commands. For example, the queue pair attributes database 164 stores information relating to a source queue pair number, a destination queue pair number, and possibly source agent and destination agent. Hence, the queue pair attributes database 164 will include all information necessary to support the different transport services, including reliable connection service, reliable datagram service, unreliable connection service, unreliable datagram service, and raw datagram service.

The queue pair attributes management module 166 manages the transport services by updating the queue pair attributes database 164 during communication between the local and remote communication agents, for example when packet sequence numbers increase as messages are exchanged between the local and remote communication agents.

The queue pair attributes management module 166 also includes service submodules 168, each configured for managing a corresponding transport service type based on a corresponding received WQE from the pre-link module 140. For example, the bypass service submodule 168a is configured for managing bypass services during connection establishment or managing queue pairs associated with management operations with network managers that use, for example, the raw datagram service. The CPU aided service submodule 168b is configured for managing queue pairs based on embedded processor operations using the embedded virtual lane FIFO 152a; hence, the CPU aided service submodule 168b enables coordination between the local and remote embedded processes; moreover, implementation of the CPU aided service submodule 168b in conjunction with the embedded virtual lane FIFO 152a enables messages to be retransmitted if a resend request is received from the remote communication agent. The reliable connection (RC) service submodule 168c and the unreliable connection (UC) service submodule 168d are configured for managing queue pairs associated with reliable connection and unreliable connection transport services, respectively. Although not shown, the queue pair attributes management module 166 also includes submodules 168 for managing reliable and unreliable datagram services, and raw datagram service.

Hence, the transport service module 142, upon receiving a WQE from the pre-link module 140, supplies the WQE to the appropriate submodule 168 for processing (e.g., WQE for RC service handled by the RC service submodule 168c). The WQE includes service level (SL) information, and a pointer to the location of the actual message in the system memory 36. The submodule 168, in response to reception of the appropriate WQE, parses the WQE, and retrieves from the WQE the pointer that identifies the memory location for the transport data (i.e., the payload for the transport layer); the submodule 168 performs a DMA fetch of the transport data, updates the appropriate queue pair attributes within the queue pair attributes database 164, and creates and stores in the external memory 148 a transport layer header for the WQE in a corresponding transport format; for example, the submodule 168a may generate a raw transport header, whereas the modules 168c or 168d may generate a transport header according to the reliable connection service or the unreliable connection service, respectively.

The submodule 168 then creates a header pointer (p1) that identifies the location of the transport layer header. The submodule 168 then sends to the post-link module 144 the payload pointer (p2) and the header pointer (p1) as a packet request 190, enabling the post-link module 144 to assemble the transport packet for transmission based on the supplied pointers. Alternately, the submodule 168 may generate a frame pointer to a system memory location that stores the transport layer frame, including the transport layer header and the transport data. If preferred, the submodule 168 also could forward the transport layer frame (including transport layer header and transport data) to the post-link module. Alternately, while writing to the external memory, the CPU may leave blank spaces at the beginning of the data, so that the actual header information that is created within the modules 168 can be stored in the corresponding empty memory space. The pointer passed down to the post-link module 144 could be this pointer which points to the beginning of the frame in the external memory.

The post-link module 144, in response to reception of the transport layer information (e.g., transport layer frame, packet request, etc.), fetches the transport layer header and the transport layer payload from the system memory 148 for generation of the transmit packet and storage in a transmit FIFO 170. In particular, the post-link module 144 also includes a link layer control module 172 configured for generating the transmit packet by generating link layer fields (e.g., local and global routing headers, cyclic redundancy check (CRC) fields, etc.), storage of the transmit packet in the transmit FIFO 170, and handling link layer control operations according to the InfiniBand™ Architecture Specification. Once the transmit packet has been generated, the pointers are forwarded to the free buffer manager 176, described below.

The link layer control module 172 outputs the transmit packets according to a credit-based flow control. In particular, the link layer control module 172 monitors the available credits for transmission of a transmit packet on the assignment virtual lane. In particular, credits are sent on a per virtual lane basis, where a receiver issues a credit based on packets taken from an incoming virtual lane buffer, the credits are sent to the sender, enabling the sender to manage flow control. Hence, if the link layer control module 172 determines that an identified virtual lane has an insufficient number of credits, the link layer control module 172 defers transmission of the corresponding transmit packet until a sufficient number of credits have been received. If the virtual lane has a sufficient number of credits, the link layer control module 172 forwards the transmit packet to the MAC module 146 for transmission.

The MAC module 146 is configured for outputting the transmit packet stored in the transmit FIFO 170 according to the InfiniBand™ Architecture Specification. In particular, the MAC module 146 includes a transmission module 174, a free buffer manager 176, an embedded processor input queue 178, and an embedded processor 180 having a link flow control packet construction module 182. The transmission module 174 is configured for performing media access control operations, and optionally physical layer transceiver operations, for transmission of the transmit packet onto the InfiniBand™ network 10.

The free buffer manager 176 is configured for releasing available space from the external memory 148 once the transmit packet has been successfully received by the responder. In particular, the memory pointers for a transmit packet are sent from the post-link module 144 once the transmit packet has been generated; if a responder sends a message that the transmit packet needs to be resent in a reliable connection service, the transmit packet can be regenerated by the post-link module 144 and retransmitted to the responder. Once the transmit packet is successfully received, the frame pointers can be released for use by another agent.

Flow control is handled by the embedded processor 180 based on reception of information from the embedded processor input queue 178: in particular, the flow control protocol according to the InfiniBand™ Architecture Specification uses a credit-based flow control. The embedded processor 180 generates link flow control packets using the link flow control packet construction module 182, based on messages stored into the embedded processor input queue 178. The embedded processor 180 writes the link flow control packet to external memory 36; the embedded processor 180 then generates a WQE that includes the associated operation and a pointer specifying the location of a flow control packet into the embedded processor virtual lane FIFO 152a. The link flow control packet can then be output, specifying a number of available credits for another transmitting note.

Hence, the embedded processor 180 can generate a link flow control frame including the flow control header, and output the link flow control frame to the error processor input queue 178 for transmission to the network.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A computing node configured for communications on an InfiniBand™ network, the computing node comprising:

first and second host channel adapters configured for respective first and second communication operations with the InfiniBand™ network; and a processor configured for monitoring the first and second communication operations and detecting a failure in any one of the first and second communication operations, wherein the processor, in response to detecting the failure as affecting the first communication operations by the first host channel adapter, is configured for causing the first communication operations to be transferred to the second host channel adapter;

wherein the first host channel adapter is configured for notifying the processor of a link failure detected between the first host channel adapter and the InfiniBand™ network, the processor configured for causing the first communication operations to be transferred to the second host channel adapter in response to the notification of the link failure.

2. The computing node of claim 1, wherein the first and second host channel adapters are configured for transfer of first and second InfiniBand™ network traffic, respectively, the processor configured for transferring the first communication operations to the second host channel adapter by redirecting the first InfiniBand™ network traffic to the second host channel adapter.

3. The computing node of claim 2, wherein the processor is configured for redirecting the first InfiniBand™ network traffic by sending a request to a subnet manager having a prescribed presence on the InfiniBand™ network.

4. The computing node of claim 1, further comprising an internal bus configured for first communications between the processor and the first host channel adapter, the processor configured for causing the first communication operations to be transferred to the second host channel adapter in response to detecting a failure in the first communications.

5. The computing node of claim 4, further comprising a second internal bus configured for communications between the processor and the second host channel adapter, the processor configured for transferring the first communication operations to the second host channel adapter by redirecting InfiniBand™ network traffic managed according to the first communication operations to the second host channel adapter.

6. The computing node of claim 1, wherein the processor is configured for causing the first communication operations to be transferred to the second host channel adapter in response to detecting a failure in the first host channel adapter.

7. A method in a computing node configured for communications on an InfiniBand™ network, the method comprising the steps of:

configuring first and second host channel adapters within the computing node for respective first and second communication operations with the InfiniBand™ network;

detecting a failure in the first communication operations by the processor within the computing node; and transferring the first communication operations to the second host channel adapter by the processor, based on the detected failure;

wherein the detecting step includes receiving a notification from the first host channel adapter of a link failure between the first host channel adapter and the InfiniBand™ network.

8. The method of claim 7, wherein the first and second host channel adapters are configured for transfer of first and second InfiniBand™ network traffic, respectively, the transferring step including redirecting the first InfiniBand™ network traffic to the second host channel adapter.

9. The method of claim 8, wherein the redirecting step includes sending a request to a subnet manager, having a prescribed presence on the InfiniBand™ network, to redirect the first InfiniBand™ network traffic from the first host channel adapter to the second host channel adapter.

10. The method of claim 7, wherein the computing node further includes an internal bus configured for first communications between the processor and the first host channel adapter, the detecting step including detecting a failure in the first communications.

11. The method of claim 10, wherein the computing node further includes a second internal bus configured for communications between the processor and the second host channel adapter, the transferring step including redirecting InfiniBand™ network managed according to the first communication operations to the second host channel adapter via the second internal bus.

* * * * *